United States Patent
Shanmuganathan

(10) Patent No.: US 7,657,701 B2
(45) Date of Patent: Feb. 2, 2010

(54) SYSTEM AND METHOD OF FLASH MEMORY WEAR LEVELING USING DISTRIBUTED WRITE CYCLES

(75) Inventor: Ca Shanmuganathan, Bangalore (IN)

(73) Assignee: The General Electric Company, Schenectady, NY (US)

(*) Notice: Subject to any disclaimer, the term of this patent is extended or adjusted under 35 U.S.C. 154(b) by 497 days.

(21) Appl. No.: 11/619,423

(22) Filed: Jan. 3, 2007

(65) Prior Publication Data
US 2008/0162786 A1 Jul. 3, 2008

(51) Int. Cl.
G06F 12/00 (2006.01)
(52) U.S. Cl. .................. 711/103; 711/165; 711/118; 711/206; 714/8
(58) Field of Classification Search .......... 711/103, 711/165, 118, 206; 714/8
See application file for complete search history.

(56) References Cited

U.S. PATENT DOCUMENTS

| | | | |
|---|---|---|---|
| 6,000,006 A * | 12/1999 | Bruce et al. | 711/103 |
| 6,125,435 A | 9/2000 | Estakhri et al. | |
| 6,621,746 B1 | 9/2003 | Aasheim et al. | |
| 7,139,863 B1 * | 11/2006 | Defouw et al. | 711/103 |
| 7,315,917 B2 * | 1/2008 | Bennett et al. | 711/103 |
| 2002/0166022 A1 * | 11/2002 | Suzuki | 711/103 |
| 2005/0204187 A1 * | 9/2005 | Lee et al. | 714/8 |
| 2007/0300008 A1 * | 12/2007 | Rogers et al. | 711/103 |
| 2008/0109589 A1 * | 5/2008 | Honda | 711/103 |

* cited by examiner

*Primary Examiner*—Hong Kim
(74) *Attorney, Agent, or Firm*—Andrus, Sceales, Starke & Sawall, LLP

(57) ABSTRACT

The wear leveling system and method spreads write cycles across a flash chip, thereby reducing repeated usage of the same areas of the flash chip, and facilitating even usage of all of the memory on the flash chip. When a delete operation occurs in the system and method, the deleted cluster is marked as "dirty" in a table, and the sector address of that cluster is calculated and written into a cache memory. When a write operation occurs, the "dirty" cluster is viewed as a used cluster in order to limit the number of writes to any particular cluster. In a write operation, an unused cluster address is retrieved from a table and a sector address is calculated. If the sector address has a good and low age count, then the write operation writes into the cache memory as well. Before the write operation writes into the cache memory, however, the system and method of the present disclosure checks whether the table requires cleaning and memory updating, or whether a switch to a new table is necessary. Once a purge or sync trigger is effectuated, all of the data written into the cache memory is written into the flash memory.

17 Claims, 5 Drawing Sheets

SYSTEM AND METHOD OF FLASH MEMORY WEAR LEVELING USING DISTRIBUTED WRITE CYCLES

FIELD OF THE DISCLOSURE

The present invention relates to the field of flash memory devices. More particularly, the invention relates to the field of flash memory storage management and wear leveling.

BACKGROUND OF THE DISCLOSURE

NAND flash chips are often times used in embedded systems for non-volatile data storage. Generally, a flash chip has a limited number of write cycles, and an embedded system micro controller writes and reads to and from the flash chip. The file system used for data storage manages the storage and retrieval of the data. The data is mapped using cluster numbers and each cluster can have many sectors of 512 bytes. When the file write is performed, the file system checks for the first free cluster and writes the data into that cluster. In frequent delete and write type of operations, the file system uses the same clusters repeatedly and reduces the life of those particular clusters. When those frequently used clusters no longer function due to overuse, the flash chip must be discarded, thus wasting a large portion of useable memory.

SUMMARY OF THE DISCLOSURE

The wear leveling system and method spreads write cycles across a flash chip, thereby reducing repeated usage of the same areas of the flash chip, and facilitating even usage of all of the memory on the flash chip. When a delete operation occurs in the system and method, the deleted cluster is marked as "dirty" in a table, and the sector address of that cluster is calculated and written into a cache memory. When a write operation occurs, the "dirty" cluster is viewed as a used cluster in order to limit the number of writes to any particular cluster. In a write operation, an unused cluster address is retrieved from a table and a sector address is calculated. If the sector address has a good and low age count, then the write operation writes into the cache memory as well. Before the write operation writes into the cache memory, however, the system and method of the present disclosure checks whether the table requires cleaning and memory updating, or whether a switch to a new table is necessary. Once a purge or sync trigger is effectuated, all of the data written into the cache memory is written into the flash memory.

One aspect of the present disclosure is a method of wear leveling a flash memory device, the method comprises retrieving a first unused cluster address from a first table block when a write operation is called, cleaning the first table block when the first table block reaches a predetermined capacity, switching to a second table block when the first table block satisfies a predetermined table block age count, and writing a second set of data associated with the write operation to a cache memory, wherein when the unused cluster address is retrieved, the cluster marked with a dirty mark is viewed as a used cluster. The method also comprises marking a cluster configured to store data with the dirty mark when a first set of data in the cluster is deleted and writing a sector address of the cluster having the dirty mark to the cache memory, and writing the sets of data in the cache memory into the flash memory device when a trigger is activated. When flash memory device is powered on, the method further includes initializing the cache memory, reading a master boot record, and retrieving a current table block address. The method further comprises retrieving a second unused cluster address from the first table block when the first unused cluster address satisfies a predetermined cluster age count, reading a set of directory information and read data from the flash memory device when a read operation exists, calculating a physical address of the read data and buffering the read data in the cache memory and reading the read data from the cache memory.

Another aspect of the present disclosure is a flash memory wear leveling system, the system comprising a first table block configured to provide a first unused address of a cluster when a write operation is called, wherein the first table block is cleaned when the first table block reaches a predetermined capacity, and further wherein the cluster configured to store data is marked with a dirty mark when a first set of data in the cluster is deleted, a second table block configured to provide the first unused cluster address when the first table block satisfies a predetermined table block age count, and a cache memory is configured to receive a second set of data associated with the write operation, wherein when the unused cluster address is retrieved, the cluster marked with the dirty mark is viewed as a used cluster, and further wherein the cache memory writes the set of data into a flash memory device when a trigger is activated and wherein a sector address of the cluster having the dirty mark is written to a cache memory. The flash memory device is powered on, and the cache memory is initialized; a master boot record is read; and a current table block address is retrieved. A second unused cluster address from the first table block is retrieved when the first unused cluster address satisfies a predetermined cluster age count. A set of directory information and read data is read from the flash memory device when a read operation exists wherein a physical address of the read data is calculated and read data is read from the cache memory.

Yet another aspect of the present disclosure is a method of wear leveling a flash memory device, the method comprising marking a cluster configured to store data with a dirty mark when a first set of data in the cluster is deleted, writing a sector address of the cluster having the dirty mark to a cache memory, retrieving a first unused cluster address from a first table block when a write operation is called, cleaning the first table block when the first table block reaches a predetermined capacity, switching to a second table block when the first table block satisfies a predetermined table block age count, writing a second set of data associated with the write operation to the cache memory, and writing the sets of data in the cache memory into the flash memory device when a trigger is activated, wherein when the unused cluster address is retrieved, the cluster marked with the dirty mark is viewed as a used cluster.

DETAILED DESCRIPTION

Figure 1:
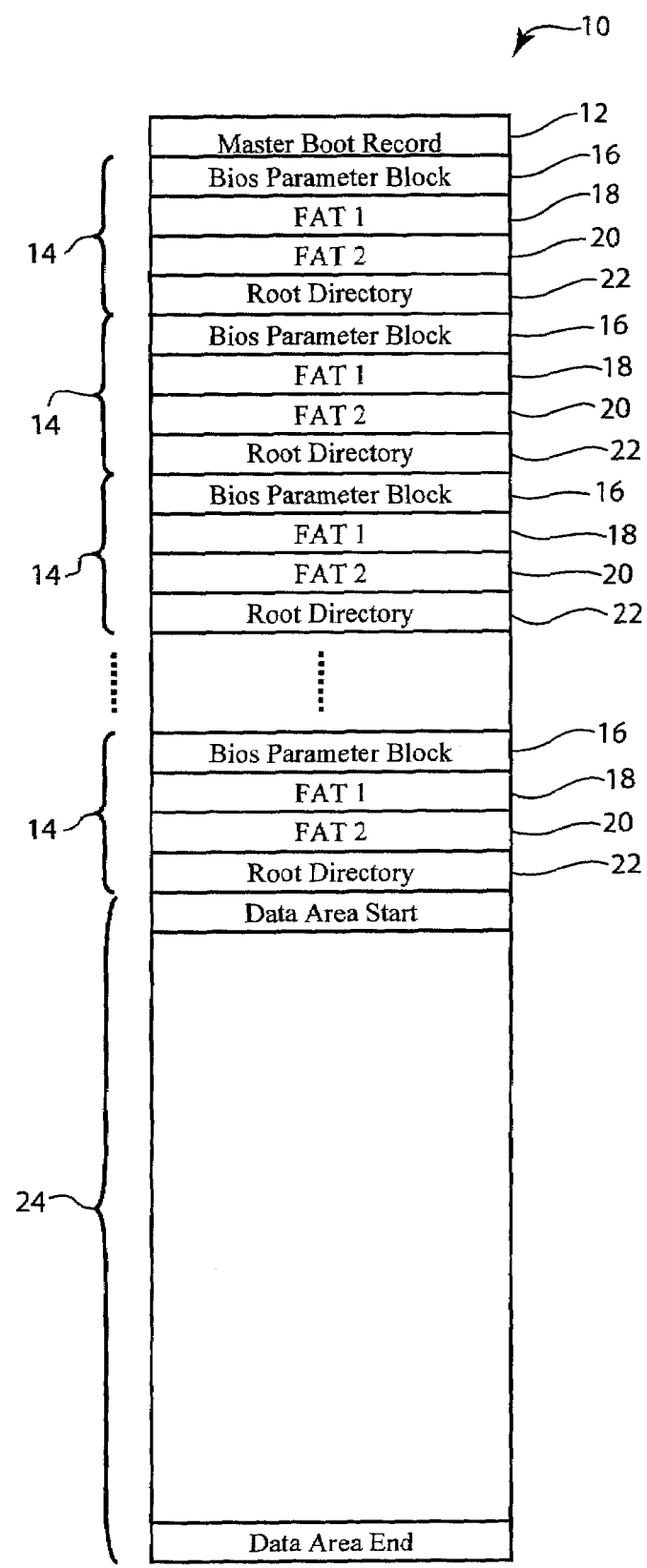
FIG. 1 is a block diagram of an embodiment of the physical mapping.
Figure 5:
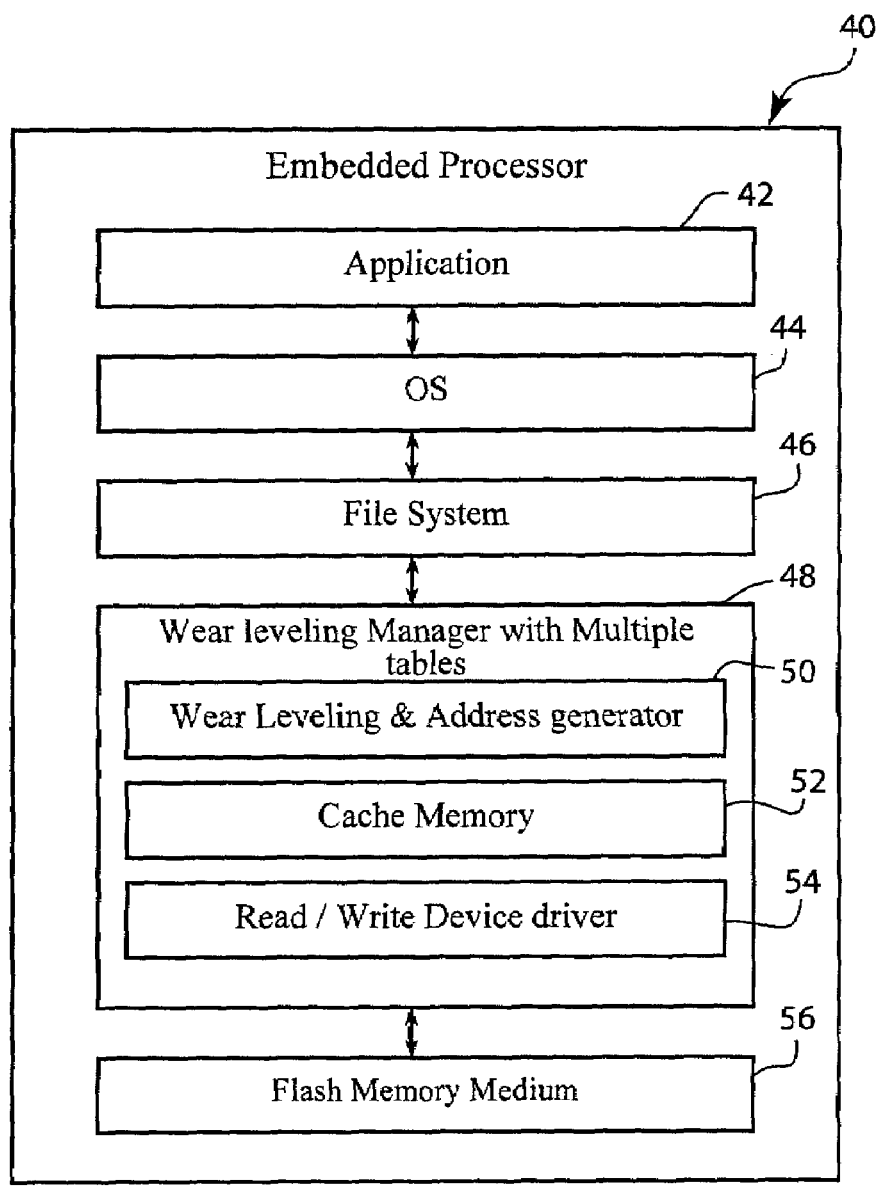
FIG. 5 is a block diagram of an embodiment of the flash memory wear leveling system.

Referring briefly to FIG. 5, the wear leveling system 48 and method is preferably implemented with a FAT12 file system. It is preferably implemented between a file system 46 layer and a flash memory driver 56. The memory 10 is logically separated into many areas as shown in FIG. 1. The Master Boot record (MBR) 12 holds the starting address of the Table Blocks 14. Preferably, the memory consists of 16 Table Blocks 14; each Table Block 14 including a Bios Parameter Block 16, FAT1 18, FAT2 20 and Root Directory 22 areas. The Data Area 24 is mapped after the 16$^{th}$ Table Block 14.

Figure 2:
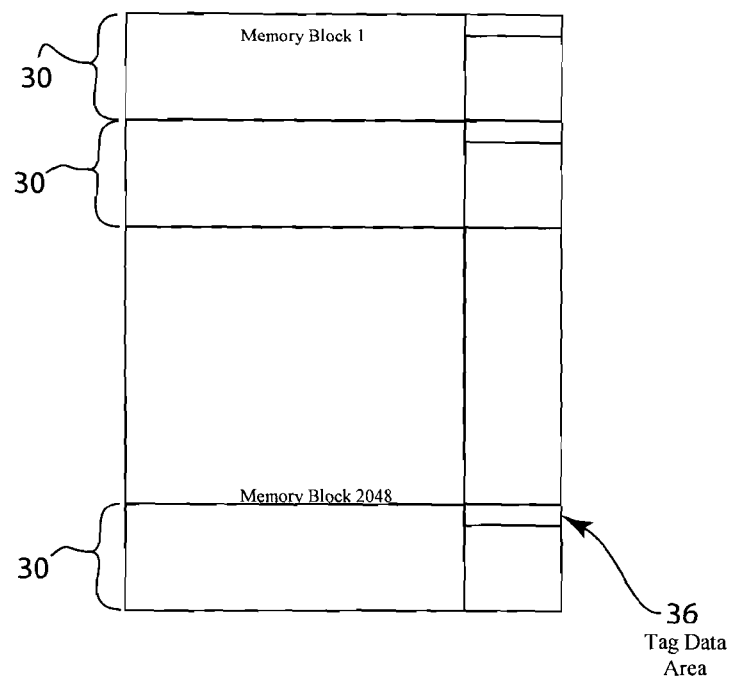
FIG. 2 is a block diagram of an embodiment of the physical flash memory.
Figure 4:
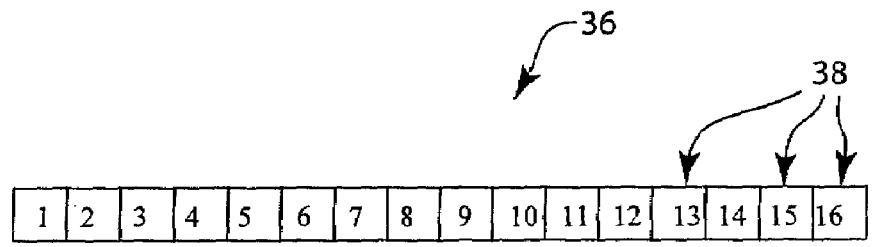
FIG. 4 is the diagrammatic representation of an embodiment of a tag data area of the physical flash memory.

The physical mapping of the flash chip is shown in FIG. 2. The data area 24 preferably includes 2048 memory blocks 30 and each block 30 has preferably 32 memory pages. Each page has a page data area 34 of 512 bytes and tag data area 36 of 16 bytes. The 512 bytes are used for the file system data and the 16 bytes are used for the flash driver. Referring to both table 1 below and FIG. 4, the erase count, bad block, error correction information, and chip status are stored in the tag data area 36 as is further described and defined in table 1 below.

TABLE 1

| Byte number | No. of bytes | Description of bytes |
| --- | --- | --- |
| 1-5 | 5 bytes | Wear/Age count |
| 6 | 1 byte | Factory marked Bad block. The system will also use the same byte for bad marking |
| 9-14 | 6 bytes | Error correction information |
| 15-16 | 2 bytes | Status information |

Referring back to FIG. 2, the write operation is performed after deleting the memory block 30, the system memory 10 (FIG. 1) is used to buffer the required data when the erase is performed, and the age count of the memory block 30 is updated after each erase operation.

Referring back to FIG. 1, the write operation needs to be updated in two areas: the root directory area 22 and the data area 24. The wear-leveling manager controls the wear leveling of the data area 24 by introducing the used or dirty mark, and then cleaning it when a predefined threshold is reached. Wear leveling is required for the write operation to spread the data across all of the memory blocks 30 of the chip. The wear leveling has two phases namely: data area wear leveling; and multiple tables.

Still referring to FIG. 1, when a file write operation is effectuated, the file data is stored in the data area 24, its cluster number and root directory information are updated in the FAT (18, 20) table and the root directory 22 area respectively. The file system always uses the first free clusters in any given table block. If the clusters are free and not dirty, it uses them for the new file write. Each time the file system write operation uses the new data area, the write is spread across the full range of the flash chip. The cluster numbers in the file system table 14 gives the reference for the write operation. The physical sector numbers are calculated from the cluster number. The delete operation does not delete or clean the table block 14, instead a dirty mark is written in the table block 14. So whenever a file delete is performed, the clusters for that file entry are marked as used or dirty, and the data areas 24 for that file are not deleted. This minimizes the effects of many erase/write operations. The used or dirty mark is viewed by the file system as a used cluster entry and it always uses the free cluster number. This enables every new write into the new cluster number, and thereby the new data area 24 is used for every file write operation. When the data usage reaches a predefined threshold, the driver cleans the table blocks 14. This clean operation removes the used or dirty marks and enables the file system to start writing to the beginning of the table blocks 14.

Referring now to FIGS. 1 and 5, the write operation is completed after the chip erase and the age count data is incremented. For every write operation, the cluster data is updated in the table block 14. To minimize the frequent write operation into the flash chip, the cache memory 52 is used. The cache 52 is implemented between the wear leveling manager 48 and the physical address generator 50. The flash manager updates the buffered data by the write operation into the flash memory 56. In current systems, the write operation is updated in the table block 14 and the file data is spread across the data area 30. This prior art method will lead to faster wear in the table block 14. In the present disclosure, the age count of the table block 14 is tracked by the wear leveling manager 48 and when it reaches the manufactured specific write count, a new table block 14 is used. This will be further discussed below in describing FIG. 6b. The entries in the current table block 14 are copied into the new table block 14 and the address pointer in the MBR 12 is updated to point the new table block 14. After switching to the new table block, the file read or write operation will use the data area 24 without any modification. The wear leveling manager address generator 50 calculates the physical offset address for the clusters in the new table block 14.

Each write operation updates the clusters in the table block 14 and increases the age count of the table blocks 14. To increase the usage of the chip, the multiple table blocks 14 are introduced in the physical memory. Once the current table block 14 age count reaches the maximum life specified by the manufacturer, the data in the current table block 14 is copied into the new table block 14 and the current table pointer in the MBR 12 is updated. The wear leveling manager 48 tracks the table blocks 14 and generates the physical address to read or write into the data area 24. The present system is preferably implemented with 16 table blocks 14 and can be extended to 32 table blocks 14. After the power up, the system reads the MBR 12 for the current active table block 14 and loads current table block 14 information structure into the system memory. As the current table block 14 is read from the MBR 12, the used previous table blocks 14, that is, the aged table blocks 14, are skipped.

Referring again to FIG. 1, the present disclosure includes 16 table blocks 14, and can be extended to 32 table blocks 14. Each table block 14 has a BIOS parameter block 16, file allocation tables FAT1 18, FAT2 20 and a root directory 22. The BIOS parameter block 16 holds the file system data structures. The FAT1 18 and FAT2 20 are the file allocation tables, containing cluster numbers of the file data. The same data is stored in the FAT1 18 and FAT2 20. The Root Directory 22 holds the file name entries. The flash driver reads the MBR 12 and locates the current table block 14 to be used for the operation. The MBR 12 will be updated whenever the current table block 14 is switched to a new table block 14, so that it will point to the new table block 14. The data information of the file is stored in the data area 24. When the file write is performed, the free cluster numbers are used to generate the physical address for the file data like a linked list. The data is stored in the data area 24, pointed by the free cluster number and the cluster number is updated in the table block 14. When the read is performed, the clusters in the table block 14 point to the data area 24 and read from the flash memory 10.

Figure 3:
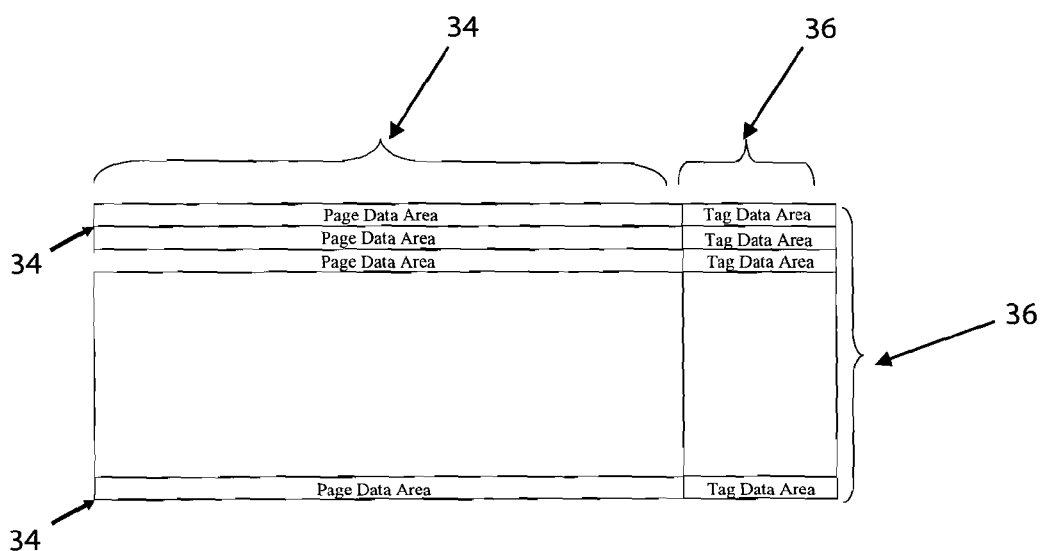
FIG. 3 is a block diagram of an embodiment of a memory block of the physical flash memory.

Referring again to FIGS. 2-4, the data area 24 is divided into blocks. The write operation is performed after the data area 24 erase. The data area 24 is divided into pages and each data area has 32 pages. Each page has two parts, namely page data area 34 of 512 bytes and tag data area 36 of 16 bytes 38. The page data area 34 is used as the storage part and the tag data area 36 is used for the wear-leveling manager 48 to update the age count, error correction codes and status of the memory block 30. After each erase operation, the age count is incremented and updated. The data is written into the data area from the cache memory and it writes the data in blocks of 16 numbers of sectors or 32 numbers of sectors, where the sectors size is 512 bytes. The read and write performance is improved by the cache data buffer.

FIG. 5 is a block diagram illustrating the overall system in an embedded processor 40. The embedded application 42 can have multiple tasks accessing the flash memory through the operating system 44. The FAT12 file system 46 is used for the wear leveling implementation. The wear-leveling manager 48 has the multiple table blocks, including address generator 50, cache memory 52, and device driver 54. When the current table block age count reaches the manufacture specified value, the wear-leveling manager 48 switches to the next table block 14. The cache memory 52 is used to buffer the flash memory data to minimize the number of read and write operations. For write operations, the data is written into the cache memory 52 and the transfer of data from the cache 52 to the flash memory 56 happens only if the driver 54 performs calls for a purge or sync operation. Also, the data will be written to the flash memory 56 if the write data size is more than the holding size of the cache memory 52. The read or write of data is performed in blocks with a block size of 16 or 32 sectors with 512 bytes per sector. The read/write device driver 54 handles the physical flash memory 56, and generates the appropriate control signals and device specific commands for the proper functioning of the system.

Figure 6A:
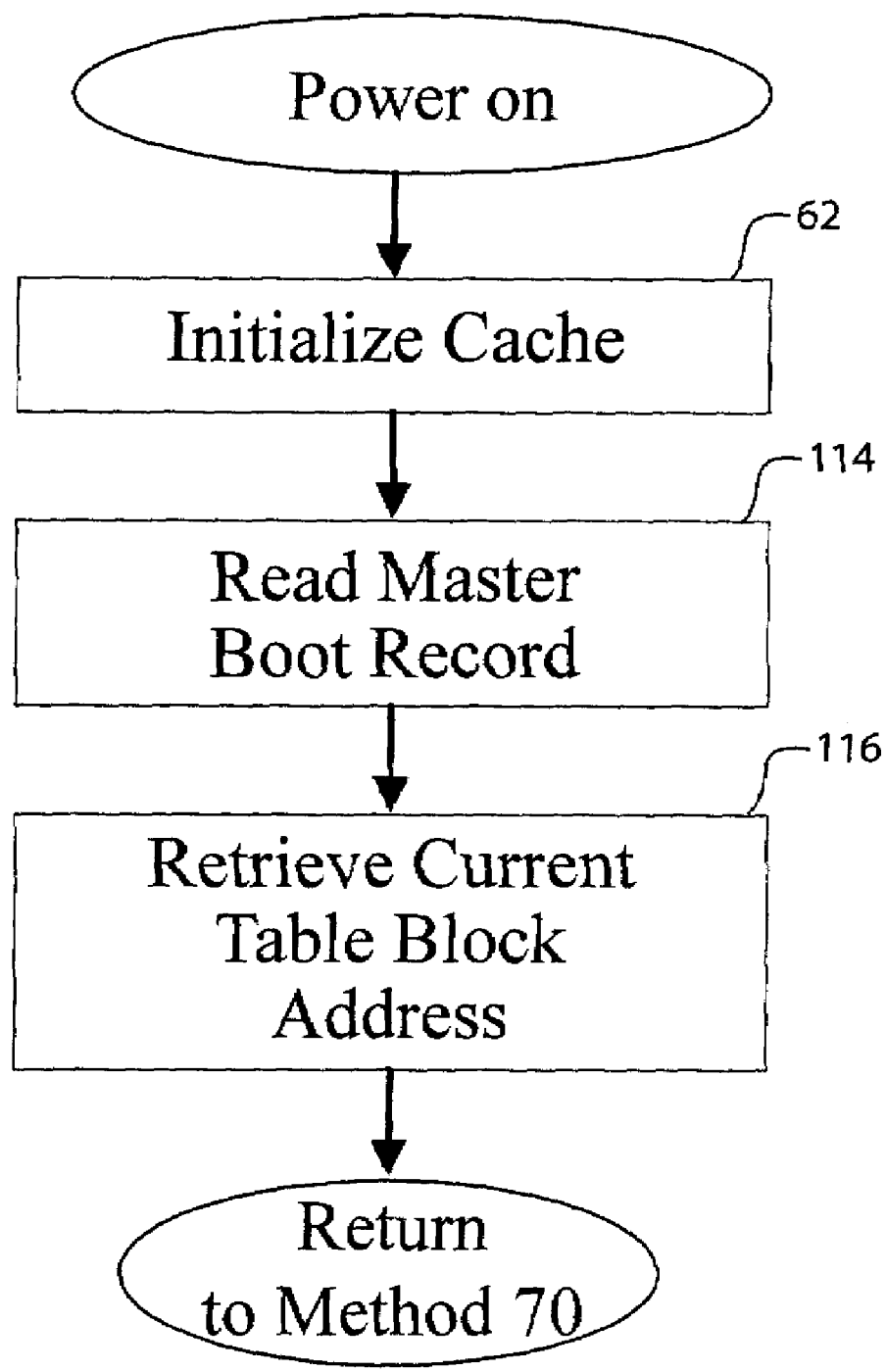
FIG. 6a is a flow chart illustrating an embodiment of a power on sequence.

FIG. 6a is a flow chart illustrating a power-on method 60. In step 62, the wear-leveling manager initializes the cache and the flash driver, and the MBR is read in step 114. The current table is read and the file systems data structures are initialized in step 116. Once the power on method is completed, the wear-leveling method 70 in FIG. 6b may be started.

Figure 6B:
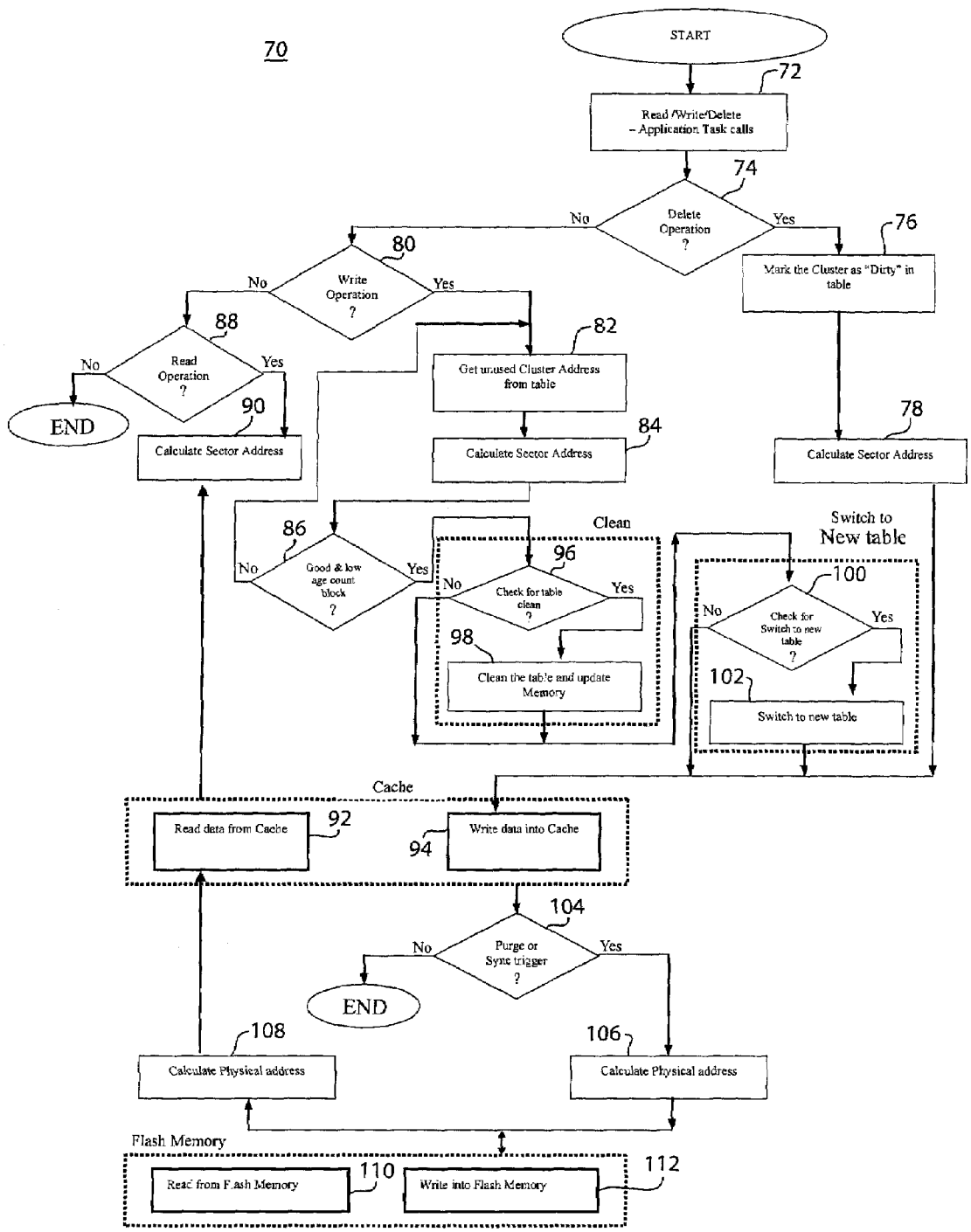
FIG. 6b is a flow chart illustrating an embodiment of a wear leveling method.

FIG. 6b is a flow chart illustrating a wear-leveling method 70. All the file system calls are passed to the physical memory through the wear-leveling method 70 in step 72. In step 74, if the call is a delete file, then the delete file system call does not remove or clean the cluster entry in the table, instead it puts a dirty or used mark on the cluster in the table in step 76. As the file systems file write operation searches for the clean or free cluster entries in step 82, this dirty mark will be viewed as a used entry and will not be used by the file system. In this way the repeated usage of the same Data Area is protected. Referring back to the step 76, after the cluster is marked as dirty, the sector address of the dirty cluster is calculated in step 78, and written into the cache in step 94.

If it is determined that the call is not a delete operation in step 74, but it is determined that a write operation exists in step 80, then the file write operation searches the free or unused clusters in the table in step 82 and calculates a sector address of a cluster in step 84, also the age and status of the sectors are checked before using it for the write operation. If it is determined that the unused cluster does not have a good and low age count block in step 86, then the method returns to step 82. If the age count is good and low in step 86, then it is determined whether the table needs to be cleaned in step 96. If not, the method 70 moves to step 100. If in step 96, it is determined that the table needs to be cleaned, the cleaning of the table is done in step 98. Cleaning is preferably done if the memory usage reaches 99% of the total capacity. Also, the average age of the dirty clusters are used to determined whether a cleaning is needed and the young clusters are cleaned as well. This prevents the repeated use of the aged clusters. After the cleaning process in step 98, the file systems write operation can use the newly available clusters. After each update, the age count of the table blocks are checked in step 100, if it reaches the manufacturer specific age count, the data in the current table block is copied into the next new table block in step 102. The MBR is updated with the new table block, and the new table block will be used for subsequent read and write operations. Regardless of whether a new table block is needed in step 100, the data is then written to the cache in step 94. After the write operation the file system updates the table with the used cluster numbers. The write operation is buffered using the cache to minimize the number of writes. The cache holds the write data and writes into the flash memory as a single or in multiple blocks. This is trapped by a purge or synch trigger in step 104. If there is no such trigger in step 104, the method ends. If such a trigger is made, then the physical address of the write is calculated in step 106 and the write made to the flash memory in step 112.

Referring back to step 80, if no write operation exists, then it is determined if a read operation exists in step 88. If no read operation exists, the method ends. If a read operation does exist, then the directory information is read from the Root Directory area of the flash memory in step 110 and the file data is read from the Data area pointed by the clusters in step 108. The cache buffers the read data in step 92 and it always reads the blocks of data from the flash memory (step 110). The wear-leveling manager calculates the logical address to the physical address. The wear-leveling manager also calculates the offset address to use different table blocks in step 90. It calculates the current table blocks address from the MBR reference and uses that to locate the current table block.

The present disclosure includes a number of advantages over the prior art such as: increased reliability—The flash chip is preferably mounted on the embedded system, and the wear leveling will increase the life of the flash chip. This increases the reliability of the system and reduces field failure; High operating speed—The prior art system uses floppy disk for the storage of records and the flash chip replaces such systems. The access time of the flash chip is very low, which increases the operating speed.

The present invention has been described in terms of specific embodiments incorporating details to facilitate the understanding of the principals of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of wear leveling a flash memory device, the method comprising:
   retrieving a first unused cluster address from a first table block when a write operation is called;
   cleaning the first table block when the first table block reaches a predetermined capacity;
   switching to a second table block when the first table block satisfies a predetermined table block age count; and
   writing a second set of data associated with the write operation to a cache memory, wherein when the first unused cluster address is retrieved, a cluster marked with a dirty mark is viewed as a used cluster.

2. The method as claimed in claim 1, further comprising marking a cluster configured to store data with the dirty mark when a first set of data in the cluster is deleted.

3. The method as claimed in claim 1, further comprising writing a sector address of the cluster having the dirty mark to the cache memory.

4. The method as claimed in claim 1, further comprising writing the first and second sets of data in the cache memory into the flash memory device when a trigger is activated.

5. The method as claimed in claim 1, wherein when the flash memory device is powered on, the method further includes:
   initializing the cache memory;
   reading a master boot record; and
   retrieving a current table block address.

6. The method as claimed in claim 1, further comprising retrieving a second unused cluster address from the first table block when the first unused cluster address satisfies a predetermined cluster age count.

7. The method as claimed in claim 1, further comprising reading a set of directory information and read data from the flash memory device when a read operation exists.

8. The method as claimed in claim 7, further comprising calculating a physical address of the read data and buffering the read data in the cache memory.

9. The method as claimed in claim 8, further comprising reading the read data from the cache memory.

10. A flash memory wear leveling system, the system comprising:
    a first table block configured to provide a first unused address of a cluster when a write operation is called, wherein the first table block is cleaned when the first table block reaches a predetermined capacity, and further wherein a cluster configured to store data is marked with a dirty mark when a first set of data in the cluster is deleted;
    a second table block configured to provide the first unused cluster address when the first table block satisfies a predetermined table block age count; and
    a cache memory is configured to receive a second set of data associated with the write operation, wherein when the unused cluster address is retrieved, the cluster marked with the dirty mark is viewed as a used cluster, and further wherein the cache memory writes the first and second sets of data into a flash memory device when a trigger is activated.

11. The system as claimed in claim 10, wherein a sector address of the cluster having the dirty mark is written to the cache memory.

12. The system as claimed in claim 10, wherein the flash memory device is powered on, and the cache memory is initialized, a master boot record is read, and a current table block address is retrieved.

13. The system as claimed in claim 10, wherein a second unused cluster address from the first table block is retrieved when the first unused cluster address satisfies a predetermined cluster age count.

14. The system as claimed in claim 10, wherein a set of directory information and read data is read from the flash memory device when a read operation exists.

15. The system as claimed in claim 14, wherein a physical address of the read data is calculated.

16. The system as claimed in claim 15, wherein the read data is read from the cache memory.

17. A method of wear leveling a flash memory device, the method comprising:
    marking a cluster configured to store data with a dirty mark when a first set of data in the cluster is deleted;
    writing a sector address of the cluster having the dirty mark to a cache memory;
    retrieving a first unused cluster address from a first table block when a write operation is called;
    cleaning the first table block when the first table block reaches a predetermined capacity;
    switching to a second table block when the first table block satisfies a predetermined table block age count;
    writing a second set of data associated with the write operation to the cache memory; and
    writing the first and second sets of data in the cache memory into the flash memory device when a trigger is activated,
    wherein when the unused cluster address is retrieved, the cluster marked with the dirty mark is viewed as a used cluster.

* * * * *

UNITED STATES PATENT AND TRADEMARK OFFICE
CERTIFICATE OF CORRECTION

PATENT NO.       : 7,657,701 B2                              Page 1 of 1
APPLICATION NO. : 11/619423
DATED            : February 2, 2010
INVENTOR(S)      : Ca Shanmuganathan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Thirtieth Day of November, 2010

David J. Kappos
*Director of the United States Patent and Trademark Office*